Oct. 11, 1932.  J. J. GILBERT  1,881,481
DUPLEX TELEGRAPH SYSTEM
Filed Feb. 3, 1932   2 Sheets-Sheet 2
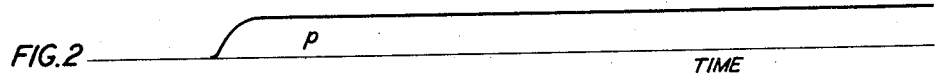
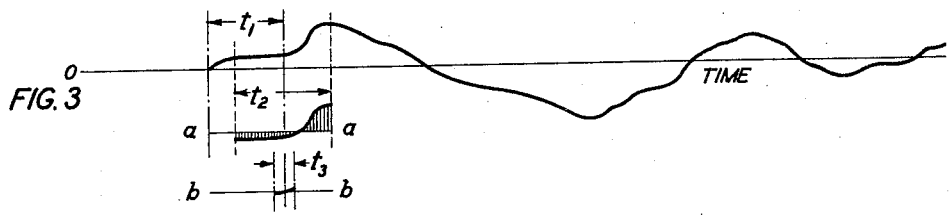
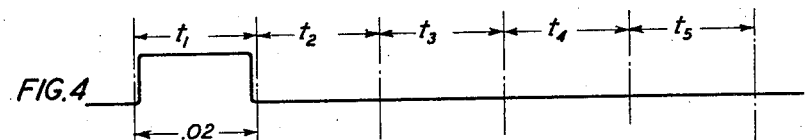
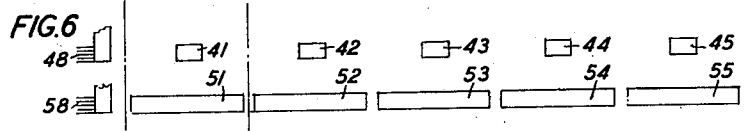
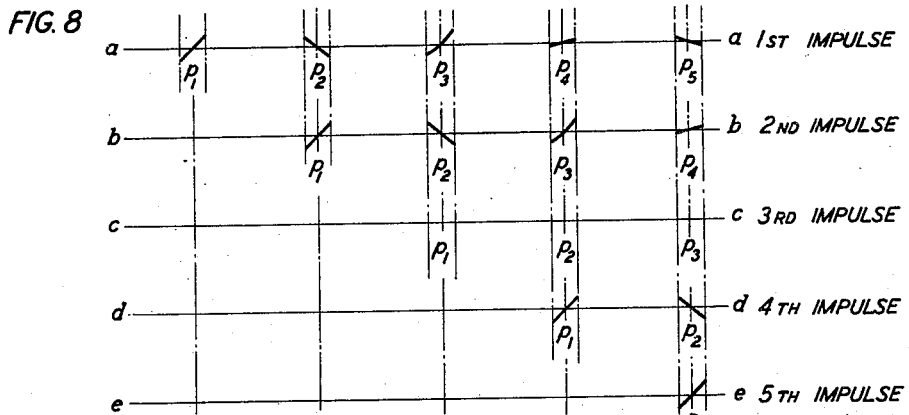
INVENTOR
J. J. GILBERT
BY
J. W. Schmied
ATTORNEY Patented Oct. 11, 1932

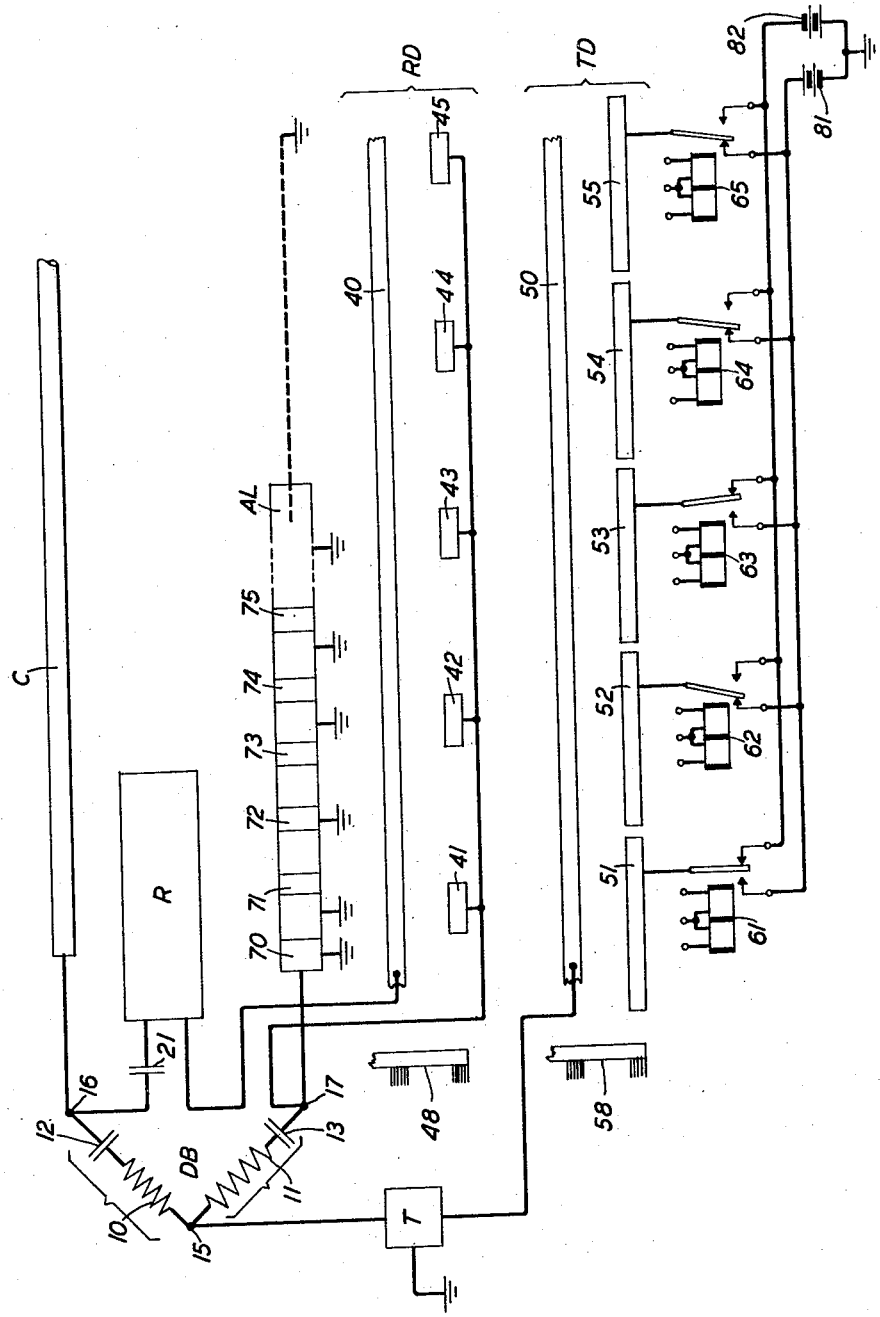

1,881,481

UNITED STATES PATENT OFFICE

JOHN J. GILBERT, OF DOUGLASTON, NEW YORK, ASSIGNOR TO BELL TELEPHONE LABORATORIES, INCORPORATED, OF NEW YORK, N. Y., A CORPORATION OF NEW YORK

DUPLEX TELEGRAPH SYSTEM

Application filed February 3, 1932. Serial No. 590,563.

This invention relates to duplex telegraph systems and more particularly to systems of this type which operate over loaded signaling lines such as continuously loaded submarine cables, and in which synchronously operating transmission and receiving devices are provided at the terminal stations.

The invention is more specifically directed to improvements in the balancing of the loaded cable in a system of this type by means of a balancing network or so-called "artificial line".

An object of the invention is to facilitate the adjustment of the artificial line to balance the cable in accordance with the requirements of efficient high speed signaling.

A duplex signaling system of the type referred to and to which the invention is applicable, comprises a duplex bridge circuit, one arm of which is connected to the cable and the other arm to the artificial line; the junction point of the arms is connected to the transmitting circuit, and a receiving circuit is bridged between the cable and the artificial line. If such a circuit were perfectly balanced, current impulses of equal amplitude and phase would pass into the cable and into the artificial line from the transmitting circuit; the receiving circuit, being at any instant subjected to equal potentials, would remain unaffected and would receive signals over the cables without interference from the transmitted signals.

In a modern cable system the speed of propagation of signal impulses over the loaded cable and the similarly loaded artificial line is so slow compared with the high frequency of transmission of signal impulses, that as many as ten or twelve impulses may be traveling simultaneously over both the cable and the line. Thus, the unbalance effect due to one impulse traveling over the length of the line circuits will persist while a number of successive impulses are being transmitted and the total unbalance effect will be a summation of the unbalance effects of all impulses at any instant traveling in the line circuits. The maximum unbalance peaks may thus be several times the amplitude of the highest peak due to a single impulse.

In loaded cable systems certain portions of the cable may be without loading and certain portions may have a heavier loading than other portions; there may be other causes of non-uniformity in the impedance along the cable both in the case of coil loaded cables and of continuously loaded cables. It is a well known fact, that in order to properly balance a cable of the type described, the artificial line must not only represent the total resistance, inductance and capacitance of the cable, but successive portions of the artificial line must closely represent the characteristics of the corresponding portions of the cable. For these reasons the adjustment of an artificial line at the time of installation, to simulate a cable of the loaded type, is a very laborious task. A particular difficulty of improving the balance by the usual method of varying all of the elements, resistance, inductance and capacity, in a section is that variations in the latter two elements change the time of propagation over the section and upset whatever degree of balance has been obtained on the subsequent sections.

In accordance with this invention an artificial line is provided which is sectionalized and in which a portion of each section is arranged to particularly facilitate close adjustment of the resistance elements within those portions, the line further being arranged in a well known manner for adjustment of all its characteristics throughout its length for general balancing.

In accordance with the invention, a method of balancing an artificial line is provided, whereby the artificial line first is adjusted to secure a fair overall balance between the cable and the artificial line, and next is carefully adjusted within those portions thereof which, due to the propagation therethrough of transmitted impulses, react upon the receiving bridge circuit during the comparatively short periods in which incoming signals are passing through the bridge circuit, to reduce to a desired minimum the unbalances occurring within such receiving periods.

In accordance with a special feature, the first balancing involves the adjustment in the artificial line of the inductance, capacity and resistance characteristics to insure a fair overall balance both in respect to amplitude and phase, which may be accomplished in any well known manner; whereas the final balancing is accomplished by adjusting only the resistance elements within the effective portions of the artificial line to reduce the amplitude of the unbalance effect upon the receiving circuit during the receiving periods. (A receiving period is a period of time assigned to the reception of a single impulse.)

In accordance with a more specific feature, the unbalance effect upon the receiving circuit of individual sections of the artificial line and the corresponding section of cable, is reduced in a special manner which depends upon the method of reception employed in the system. Thus, where an integrating method of reception is used the unbalance effect of a section is reduced by adjusting the section, so that the summation of all unbalances due to different parts thereof will be a minimum, whereas in systems where the period reception of a signal impulse is nearly instantaneous, i. e., short compared with the total impulse period, the unbalance effect of a section is reduced by reducing to a minimum the unbalance occurring only during the short period in which an impulse is being received.

In the following more detailed description of the principles underlying the invention and of a system employing the invention, reference will be made to the accompanying drawings in which:

Fig. 1 is a circuit diagram showing a preferred form of a terminal station for operation over a long submarine cable in accordance with the invention; and Figs. 2 to 8 are diagrams intended to aid in the understanding of the principles of the invention, as hereinafter described.

Referring now to the circuit diagram shown in Fig. 1 a duplex bridge circuit DB comprises sending arms 10 and 11 including sending condensers 12 and 13. The sending arms are joined at the apex 15 to which the transmitting circuit T is connected, this circuit including the necessary amplification and shaping equipment. Between the bridge points 16 and 17 is connected a receiving circuit including the receiving condenser 21 and the receiving equipment R, the latter including the necessary shaping networks, amplifier equipment and recording device. From the bridge point 16 is a connection to the terminal of a long submarine cable C and from the bridge point 17 connection is made to the artificial line AL.

The station also includes mechanically driven transmitting and receiving distributors TD and RD, which are connected to the transmitting and receiving circuits respectively and serve to properly time the transmitted and received signals in a well known manner, and which are being driven in synchronism with distributors at the remote station in any well known manner; only those parts of these distributors, which are essential to an understanding of the invention are shown in the diagram. Thus, the receiving distributor comprises the common ring 40 and the segments 41, 42, 43, 44 and 45, each of which serves to complete the receiving circuit when the wipers 48 in passing over the segments bridge the gap between them and the ring 40. The transmitting distributor similarly comprises the common ring 50 and the segments 51, 52, 53, 54 and 55, which are successively connected to the ring 50 by the passing of the wipers 58 to complete the transmitting circuit from the batteries 81 and 82 over the alternate contacts of the transmitting relays 61, 62, 63, 64 and 65. Positive or negative potentials are thereby successively impressed upon the transmitting circuit T, depending upon the setting of the relays 61 to 65 in accordance with a desired code, relays 61 to 65 being operated by an automatic transmitting device which is not shown but which may be of any desirable and well known construction. In consequence signals of either character will be produced in the transmitting circuit and applied over the apex 15 to the cable and the artificial line in multiple.

The elements of the circuit shown in Fig. 1 and their coordination and operation is believed to be sufficiently well known to not require further explanation.

The invention being particularly directed towards the arrangement of the artificial line and the balance thereof at the time of installation in a system such as shown in Fig. 1, a detailed description of these features will now be given.

When the installation of the system has been completed the artificial line is first balanced against the cable by any well known method to secure a balance, whereby the peaks of the unbalance curve are reduced to within a convenient limit. When, for example, a constant potential P as shown in Fig. 2 is suddenly applied to the apex point 15, the instantaneous unbalances caused by the traveling of the wave front over successive points in both the cable and the artificial line may be observed in the receiving circuit R and a record may be made of the unbalance curve, as shown in Fig. 3, in which the ordinates represent the instantaneous reactions upon the receiving circuit. Whereas the curve shows considerable irregularity in the balance, its general location with respect to the zero line is such as to indicate that a fairly good overall balance obtains. The adjustment of the artificial line may, of course, involve adjustment of the resistance, capacity and inductance elements, and due to practical conditions, such as variations in the cable, temperature changes, disturbances due to extraneous interference and the complexity involved in adjusting the three types of elements constituting the line, the balance which can be obtained in this manner at a reasonable expenditure in time is quite limited, and it is desirable to reduce the expense involved in securing the high balance required for the successful operation of the system.

Assuming that the preliminary balancing has been carried only to the extent of securing a fair overall balance, it is possible by the method about to be described to secure a satisfactorily limited unbalance effect with the consumption of much less labor than has heretofore been possible.

Let it be assumed that a signal arrive over the cable and that its middle point arrive at the time $t_1$ after the application of the constant potential P as indicated in Fig. 3, the duration of the signal being $t_2$; it will then be evident that the received signal will be subjected to considerable disturbance caused by the unbalance reaction of the transmitted wave during the time $t_2$. It should be noted in this connection, that the reactions which affect the bridge circuit a time $t$ after the application of the voltage P are due to the passage of the wave front over points in the line and in the cable at a time $\frac{1}{2} t$, since the reaction from these points will require a time $\frac{1}{2} t$ in reaching back to the bridge circuit. Readjustment of the elements constituting the corresponding portion of the artificial line may then be made, whereby the unbalance effect during the time $t_2$ may be made negligible or zero. Thus, by shifting that portion of the unbalance curve corresponding to the time $t_2$ with respect to the zero line, as shown at $a$—$a$, the integrated unbalance effects in one direction are made to substantially neutralize those in the other direction; or, in the case where the received impulse is very short, as shown at $b$—$b$ where the time $t_3$ is nearly instantaneous, the short portion of the unbalance curve may be shifted by adjustment of the correspondingly short portion of the artificial line, so that the curve passes through zero during the short interval. It is apparent, therefore, that unbalances in any other portion of the artificial line would have no effect upon a signal received under the conditions assumed.

Assuming next a system, such as that shown in Fig. 1, under ordinary operating conditions, and that a signal code combination be sent which comprises a single impulse transmitted within the time $t_1$, as shown in Fig. 4; the unbalance curve observed during the passage of this impulse through the cable and the artificial line, after a fair overall balance has been secured, may then take a form such as shown in Fig. 5. The transmitted impulse may be due to the passing of the wiper 58 over transmitting segment 51 represented in Fig. 6 in proper time relation to Figs. 4 and 5. With an arrangement of the receiving segments 41 to 45 as represented in Fig. 6 there will be corresponding time intervals at points $p_1$ to $p_5$ the time $t$ apart on the unbalance curve, at which impulses may be expected to arrive from the cable and during which it is essential that the unbalance be within a desired minimum. (The signal period $t$ is about .02 second or less in a high speed system.) For this reason the final balancing is proceeded with for each portion of the artificial line which corresponds to these receiving periods and to all similar succeeding receiving periods throughout the artificial line in accordance with the method described above in connection with Figs. 2 and 3. Taking first point $p_1$, the opposed unbalance effects during the period corresponding to segment 41 happen to be substantially equal and no further balancing is required; at point $p_2$ it is necessary to lower a portion of the curve with respect to the zero line in order that the unbalance effects may be equalized while the brush 48 passes over segment 42; and at point $p_3$ the adjustment must have the effect of raising the portion of the curve which corresponds to segment 43 with respect to the zero line, etc. In this manner the passing of the transmitted signal through successive portions of the artificial line and of the cable corresponding to points $p_1$ to $p_5$ will have no distorting effect upon signals received during those five time intervals; the remainder of the artificial line will be balanced according to the same principles, so that portions throughout the artificial line, spaced apart as to speed propagation of a transmitted signal therethrough by the time $\frac{1}{2} t$, will individually have no unbalance effect upon the receiving bridge circuit.

Let it then be assumed that, after the final balancing of the artificial line against the cable, a signal combination, such as shown in Fig. 7, be transmitted. The propagation over the artificial line and the cable of the first impulse, transmitted during the time $t_1$, will react upon the receiving circuit in accordance with the unbalance curve shown in Fig. 5. The portions of this unbalance curve, which will be effective during the first few receiving periods, are shown in Fig. 8 at $a$—$a$ in their proper time relation to Fig. 6. While yet the first impulse is traveling through the artificial line the second impulse, transmitted during the time $t_2$, enters the artificial line and the cable, and the portions of the unbalance curve, which are effective during receiving periods due to the passage of the second impulse are shown in Fig. 8 at $b$—$b$.

Similarly, by the transmission of the third, fourth and fifth impulses the effective portions of the unbalance curves will be as shown at $c$—$c$, $d$—$d$ and $e$—$e$, respectively. Considering, for example, the effect of the four first signals traveling after one another through the artificial line and the cable at the time the receiving circuit is closed over segment 44, as shown for points $p_4$, $p_3$, $p_2$ and $p_1$ in Fig. 8, it is evident that since each of these unbalance effects is reduced to a minimum the total effect will be a minimum, no matter what the signal combination may happen to be.

From the above it is apparent that the final close balancing may be concentrated within comparatively short sections of the artificial line, it being only necessary to adjust the intervening sections in response to the reactions upon them from the adjustment of the adjoining sections for the purpose of maintaining a fair overall balance, and that therefore the task may be considerably simplified by such a provision.

However, the task may be further simplified in accordance with the invention by the adoption of a special method of adjustment for the shifting of the effective portions of the unbalanced curve.

As has been explained above, it is not necessary that the portion of the unbalance curve at any one point, such as $p_3$, coincide with the zero line for the whole receiving period, and it is only necessary that the unbalance effects within the receiving period neutralize each other. Thus, whereas it may be reasonably convenient to adjust the inductance, capacitance and resistance elements of the artificial line within a portion corresponding to the receiving time, as at $p_3$, it has been found, that once a fair overall balance has been attained for the whole artificial line it is not necessary to readjust the inductance and capacitance within the portions coinciding with the receiving periods, and that the adjustment of only the resistance elements within such a portion is effective in shifting the unbalance curve for the portion with respect to the zero line without appreciably changing the curve form within the receiving period and that thereby the same results may be obtained as described above. The work of final balancing is thus greatly simplified, since only one of the three characteristics need be adjusted. It is of further advantage that, by confining the final balancing to the resistance elements, the phase relation between the cable and the artificial line is not disturbed.

The soundness of this principle will be apparent from the following considerations. Assuming for a portion of the artificial line, which due to a transmitted signal would react upon the receiving circuit during the time interval corresponding to segment 43, that the resistance of that portion be $R$, the inductance $L$ and the capacitance $C$ and that the corresponding quantities for the cable $R'$, $L'$ and $C'$ and that these quantities are constant for varying current of signal amplitude, and further that the leakance is negligible. It has been shown by Carson (Transactions, A.I.E.E., Vol. XXXVIII, page 381, 1919) that when a steady voltage of unit amplitude is applied to such a circuit the current in the artificial line is given by:

$$A = \sqrt{\frac{C}{L}} \epsilon^{-\rho t} I_0 (\rho t)$$

and that in the cable by:

$$A' = \sqrt{\frac{C'}{L'}} \epsilon^{-\rho' t} I_0 (\rho' t),$$

where $$\rho = \frac{R}{2L}$$

and $I_0$ is a Bessel function of zero order.

The quantity $\frac{1}{A} = Z$ is in the nature of an instantaneous input impedance and if a current of known wave form is flowing in the circuits, the terminal voltage can be computed by the methods given by Carson. It is sufficient for the present purpose to know, that if approximately similar voltages be applied simultaneously to equivalent lengths of artificial line and cable, the quantity $Z$—$Z'$ would be an indicator of the magnitude of the unbalancing voltage produced by those lengths of the line and the cable. For the short lengths under consideration $\rho t$ will be small and it will be proper to simplify by writing:

$$\epsilon^{-\rho t} = \frac{1}{1 + \rho t}$$

and $$I_0(\rho t) = 1;$$

then $$Z = \sqrt{\frac{L}{C}} (1 + \rho t) = \sqrt{\frac{L}{C}} + \frac{R}{2} \frac{t}{\sqrt{CL}}$$

and $$Z' = \sqrt{\frac{L'}{C'}} (1 + \rho' t) = \sqrt{\frac{L'}{C'}} + \frac{R'}{2} \frac{t}{\sqrt{C'L'}}$$

The unbalance voltage due to the short lengths of the artificial line and of the cable then is indicated by:

$$Z - Z' = \sqrt{\frac{L}{C}} - \sqrt{\frac{L'}{C'}} + \left( \frac{R}{2\sqrt{CL}} - \frac{R'}{2\sqrt{C'L'}} \right) t$$

From this expression it is evident that the value of $Z$—$Z'$, and with that the value of the unbalance voltage for a given short portion of line and cable may be changed as desired by changing the value of $R$. Thus, $R$ may be adjusted to a value which would make the third term of $Z$—$Z'$ equal to the difference between the first and second terms, thereby making Z—Z' equal to zero. In this manner a short portion of the unbalance curve may be shifted, as shown within the time $t_3$ at b—b in Fig. 3, by adjustment of only the resistance elements. Similarly, for a longer portion of the unbalance curve, as shown within the time $t_2$ in Fig. 3, the value of R may be adjusted so that the opposite unbalance values substantially neutralize each other, when integrated, as indicated at a—a in Fig. 3.

In the case of an actual cable, where the electrical parameters vary with the current, the unbalance characteristic will not be a linear function of the current as in the case assumed above; but it has been found that the general slope and the point of zero unbalance can be varied by the same method of varying only the resistance characteristic in the artificial line without materially affecting the shape of the unbalance curve.

The methods of balancing described above are applicable to the ordinary telegraph systems in which only a comparatively short part of the received signal is impressed upon the receiving equipment. An example of a system of this type is described in Patent 1,548,597 issued to J. J. Gilbert on August 4, 1925, and the system described above and shown in Fig. 1, is of this general type. The actual receiving period is usually between ½ and ⅓ of the signal period, as determined by the relative lengths of the receiving and sending distributor segments. In this type of system, the final balancing of the artificial line would be confined to short portions, whose unbalance reactions would coincide with the short receiving periods, and the resistance of these portions would be adjusted to shift the unbalance curve as indicated at b—b in Fig. 3.

The methods of balancing in accordance with the invention are also applicable to the type of system disclosed in Patent 1,668,888 issued to O. E. Buckley on May 8, 1928, which is characteristic in this that the receiving time for incoming signals is practically equal to the signal period, so that the incoming signal is impressed for its full length upon the receiving circuit where it subsequently is integrated and impressed upon the recording equipment. It is evident that the unbalance voltages affecting the receiving circuit during the reception of a signal will be similarly integrated and impressed upon the recording device. In this type of system the final balancing of course may extend over the total length of the artificial line, but the adjustment of each section whose unbalance reaction would coincide with a receiving period need be made only with the resistance elements of the section to shift the unbalance curve as indicated at a—a in Fig. 3.

Referring again to the system shown in Fig. 1 there will be portions in the artificial line such as 71, 72, 73, etc., spaced in time of propagation by half the time of a signal period and each having a length corresponding in its time of propagation to half the receiving period of the receiving distributor segments. For the purpose of practicing the invention, the resistance elements of these portions of the artificial line may be more finely subdivided than those of the intervening portions thereby permitting closer adjustment than in the intervening portions. It may also be convenient to provide a padding section 70 of the artificial line for the purpose of properly orienting the time of passage of the transmitted signals through the portions 71, 72, 73, etc., of the artificial line with respect to the receiving signals. In all other respects, the artificial line may be designed in any well known manner.

In certain automatic telegraph systems where the middle portions of incoming signals is used for operation of the receiving equipment, another portion is used for the purpose of maintaining synchronism between the distributors at opposite ends of the cable. This synchronizing portion may be taken about the point where the change-over between successive signals occurs. For a description of systems of this kind reference may be had to a paper by H. H. Harrison published in Institution of Electrical Engineers—Journal 1929–1930, vol. 68, page 1369.

The invention may obviously also be applied in systems of this type to the balancing of the artificial line, not only for the sections which react upon the bridge circuit during the ordinary receiving periods, but also for those sections which react during the synchronizing periods.

What is claimed is:

1. A duplex signaling system, including a magnetically loaded submarine cable and a duplex bridge circuit connected to said cable, which comprises a transmitting circuit including a sending distributor, a receiving branch including a receiving distributor for synchronous operation with said sending distributor and oriented with respect thereto for proper timing with respect to outgoing impulses, a balancing network for simulation of the characteristics of said cable having inductance, capacitance and resistance elements adapted for adjustment of said network throughout its length for a fair overall balance and having a plurality of sections spaced as to time of signal propagation by one half of a signal period, each of said sections having its resistance elements adapted for close adjustment to such values that the unbalance effects upon said receiving branch due to propagation of impulses through said section and the corresponding cable section will substantially compensate for each other during the receiving time of incoming impulses.

2. In a duplex signaling system, including a magnetically loaded submarine cable and a balancing network therefor, having inductance, capacitance and resistance elements, the method of adjusting said network to substantially balance said line with respect to a duplex bridge circuit connected thereto, which comprises adjusting the elements of said network throughout its length to reduce unbalance at any point thereof to within a predetermined practical limit, dividing said network into sections each having a period of propagation such that the signal period will be a multiple thereof, adjusting one of said sections so that the opposite effects on received impulses in said duplex bridge circuit of unbalance voltages from said section due to a transmitted signal being propagated therethrough will be substantially equalized, and similarly adjusting the remaining sections to equalize the opposite effects on received impulses of their individual unbalance voltages.

3. The method in accordance with claim 2 in which the adjusting of one section consists in adjusting the resistance therein to shift the unbalance voltages produced by different portion of said section in said duplex bridge circuit so that their opposite effects on a received impulse will be substantially equalized, and the adjusting of the remaining sections consists of a similar adjustment of the resistances in those sections.

4. The method of reducing unbalance effects in a duplex signaling system including a magnetically loaded submarine cable, a duplex bridge circuit, a balancing network for simulation of the inductance, capacitance and resistance characteristics of said cable and transmitting and receiving distributors, which comprises the steps of dividing said balancing network into a plurality of sections having equal periods of propagation, reducing the peaks of the unbalance characteristic of said network to within a convenient practical limit, adjusting the resistance characteristic of each section to shift the unbalance characteristic of a portion thereof with respect to the zero unbalance, and synchronizing said receiving distributor for reception of a signal once within the time during which the reaction of a transmitted signal impulse traversing the adjusted portion of one of said sections is impressed upon said bridge circuit.

5. The method of reducing unbalance effects in a duplex signaling system including a magnetically loaded cable line, a duplex bridge circuit having a receiving branch, and a balancing network for simulation of said cable line which comprises selecting successive portions of said network to have their centers a half signal impulse period apart in electric distance and to each have an electric length about half a receiving period, adjusting each of said portions to have its unbalance effects upon said receiving circuit substantially neutralized, and transmitting a signal impulse to traverse one of said portions at such time that the reactions due thereto will become effective in said receiving branch during a receiving period.

In witness whereof, I hereunto subscribe my name this 1st day of February, 1932.

JOHN J. GILBERT.